Aug. 19, 1941.    F. R. SCHMITT    2,253,139
CIGAR PACKING MACHINE
Original Filed Aug. 28, 1933    13 Sheets-Sheet 1

Inventor
FRANK R. SCHMITT
By George S. Hastings
Attorney

Aug. 19, 1941.  F. R. SCHMITT  2,253,139
CIGAR PACKING MACHINE
Original Filed Aug. 28, 1933   13 Sheets—Sheet 6

Inventor
FRANK R. SCHMITT
By George G. Hastings
Attorney

Aug. 19, 1941.  F. R. SCHMITT  2,253,139
CIGAR PACKING MACHINE
Original Filed Aug. 28, 1933  13 Sheets-Sheet 7

Inventor
FRANK R. SCHMITT
By George S. Hastings
Attorney

Aug. 19, 1941.   F. R. SCHMITT   2,253,139
CIGAR PACKING MACHINE
Original Filed Aug. 28, 1933   13 Sheets-Sheet 9

Inventor
FRANK R. SCHMITT
By George S. Hastings
Attorney

Aug. 19, 1941.   F. R. SCHMITT   2,253,139
CIGAR PACKING MACHINE
Original Filed Aug. 28, 1933   13 Sheets-Sheet 11

Inventor
FRANK R. SCHMITT
By George S. Hastings
Attorney

Aug. 19, 1941.   F. R. SCHMITT   2,253,139
CIGAR PACKING MACHINE
Original Filed Aug. 28, 1933   13 Sheets-Sheet 12

Inventor
FRANK R. SCHMITT
By Georges S. Hastings
Attorney

Aug. 19, 1941.   F. R. SCHMITT   2,253,139
CIGAR PACKING MACHINE
Original Filed Aug. 28, 1933   13 Sheets-Sheet 13

Inventor
FRANK R. SCHMITT
By George S Harting
Attorney

Patented Aug. 19, 1941

2,253,139

UNITED STATES PATENT OFFICE 2,253,139

CIGAR PACKING MACHINE

Frank R. Schmitt, Queens Village, N. Y., assignor to International Cigar Machinery Company, a corporation of New Jersey Original application August 28, 1933, Serial No. 687,179. Divided and this application August 26, 1937, Serial No. 160,961

5 Claims. (Cl. 192—125)

This invention relates to a machine for rapidly and economically packing groups of cigars, by successively enclosing the cigars in individual wrappers, grouping the wrapped cigars in predetermined numbers, supplying and opening collapsed cartons, inserting the groups of cigars in the opened cartons, and closing the filled cartons.

Another object is to provide means for so synchronizing the various mechanisms of the machine that failure of the cigars to be supplied from the wrapping means to the cartoning means will automatically stop the cartoning means and thus avoid packaging groups of less than the desired number of cigars.

An object of notable importance is to provide improved means for detecting the presence or absence of a cigar in or from its intended position, and also means for detecting such qualitative disconformities from an established standard as the presence of a cigar that is not of the proper length, and of the proper density; together with means for registering such a disconformity in a useful fashion, as for example, by stopping the machine, to afford an opportunity for rectifying the disconformity.

Another object of the invention is to provide novel and efficient means for closing and sealing the package and for inserting the tongue flap after filling the package shell.

Other objects are to provide improved carton feeding and opening means and improved devices for inserting groups of cigars in opened cartons. Thus it is an object of the invention to provide an organized machine which will feed collapsed cartons from a stack and will automatically and without manual handling, open said cartons and insert individually wrapped cigars in said cartons, and close the cartons ready for marketing.

This application has been divided from application Ser. No. 687,179, filed August 28, 1933, now issued as Letters Patent No. 2,095,938, dated October 12, 1937.

Still another object is to provide for preventing turning of the cigars, to keep the banded or printed side of the wrapped cigar up and in visible position in the carton of a window type.

Another object of the invention is to provide an improved cigar package of a type which is as satisfactory as expensive packages and which at the same time is more inexpensive and easier to remove cigars from. With these and other objects not specifically mentioned in view, the invention consists in certain constructions and combinations which will be hereinafter fully described and then particularly pointed out in the claims hereunto appended.

In the accompanying drawings in which like characters of reference indicate the same or like parts—

Fig. 19 is an end elevation of the inserting mechanism;

Fig. 20 is a plan view of the mechanism shown in Fig. 19;

Fig. 21 is a detail view in side elevation of the cigar inserting mechanism of Fig. 19;

Fig. 22 is a detail of the mechanism shown in

Fig. 19, taken in elevation but from the opposite side;

In the particular embodiment herein illustrated, there is provided in combination with instrumentalities for successively wrapping cigars in individual wrappers and for forwarding the same together with means for receiving the individually wrapped cigars and grouping the same in cartons containing a predetermined number of cigars, mechanism for supplying opened cartons and devices for successively inserting the groups of cigars in said cartons. Preferably there is provided mechanism for engaging the wrapped cigars prior to insertion thereof in the carton operating to stop the operation of said devices if a group is incomplete. In the best constructions contemplated, said means, devices and mechanisms include instrumentalities operating to maintain the same side of the cigar up, throughout their operation, and said means include grippers arranged to engage a predetermined number of cigars while the cigars are in contacting row relationship. The various means referred to may be varied widely in construction within the scope of the claims, for the particular device selected to illustrate the invention is but one of many possible concrete embodiments of the same. The invention therefore is not to be restricted to the precise details shown and described nor to the particular embodiments chosen as illustrative of the invention.

Referring now to the drawings, a supply of collapsed cartons C is stacked in a carton magazine 1. The cartons in this stack rest on a reciprocating table 2 (see Figs. 10 and 12) provided to the rear of the stack with feeding ledges 3 which serve to catch the edge of the lowermost carton and feed the same out of the stack. After this carton is fed from the stack it is caught against backward movement with the return of the table by means of a pair of latch or hook members 4 (Fig. 11) which rest by gravity on the lowermost carton being ejected. The forward end of the hooks nearest the stack is beveled to permit the edge of the ejected carton to slip under the same. The table 2 on returning removes its supporting effect from under the ejected carton which then drops into the pocket 5 of the carton conveyor presently to be described (Fig. 9).

Figures 9, 10, 11, 12:
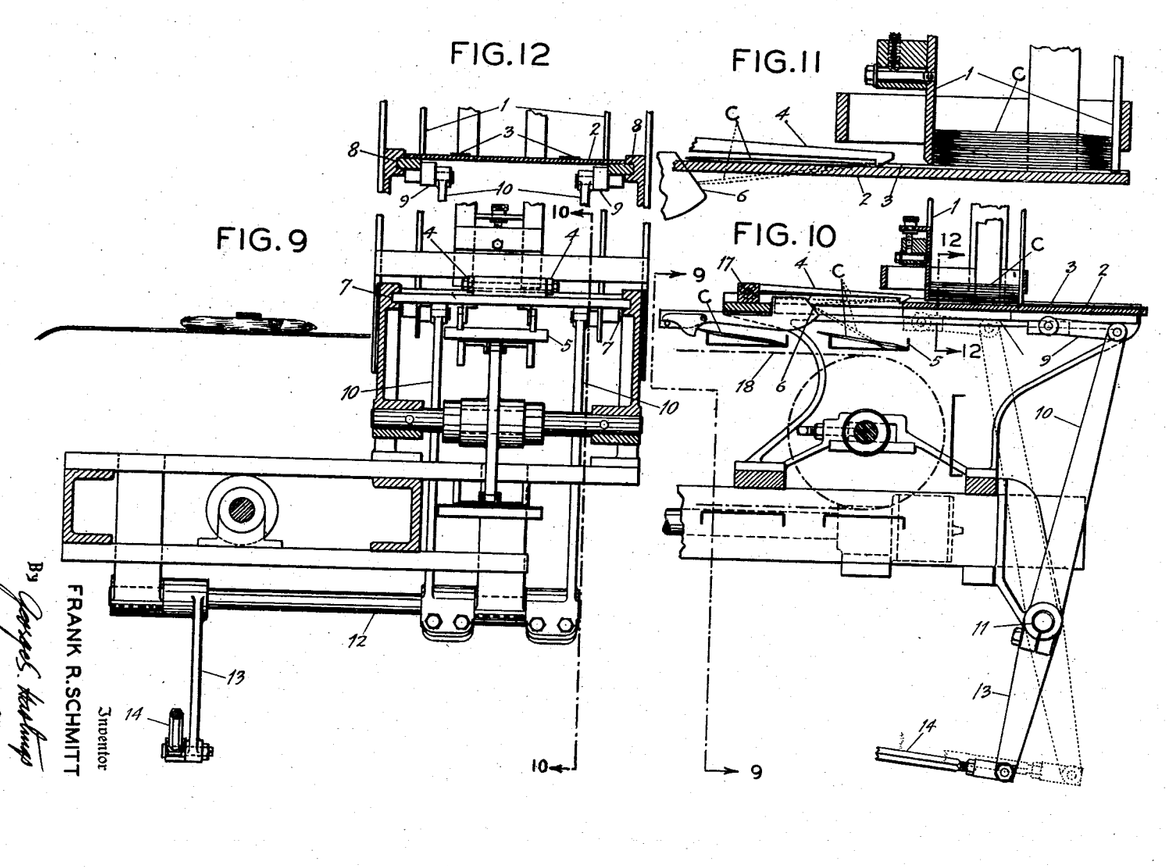
Fig. 9 is a view in end elevation showing the carton feed.
Fig. 10 is a sectional view in side elevation showing a detail of the carton feed, this section being taken on the line 10—10 of Fig. 9.
Fig. 11 is a detail view in sectional side elevation showing a part of the mechanism shown in Fig. 10.
Fig. 12 is a detail view in sectional end elevation on the line 12—12 of Fig. 10.

The rear edge of the carton drops first due to an abutment 6 in the path of the forward edge which temporarily supports said edge when the carton is in an inclined position as shown in Fig. 10, in dotted lines, but almost immediately permits the carton edge to slip off to the position shown in full lines.

The carton feeding table 2 is reciprocated in a slideway 7 (Fig. 9) being supported therein by slide strips 8 (Fig. 12) secured to the table 2, which slide strips are connected by links 9 to a pair of levers 10 pivoted at 11 (Fig. 10) and linked through shaft 12, crank 13 and rod 14 to a cam lever 15 engaging the cam on the shaft 16. The hook 4 is pivotally supported at 17 to rest by gravity on the carton C (Fig. 11).

Figures 13, 14, 15, 16, 17, 18:
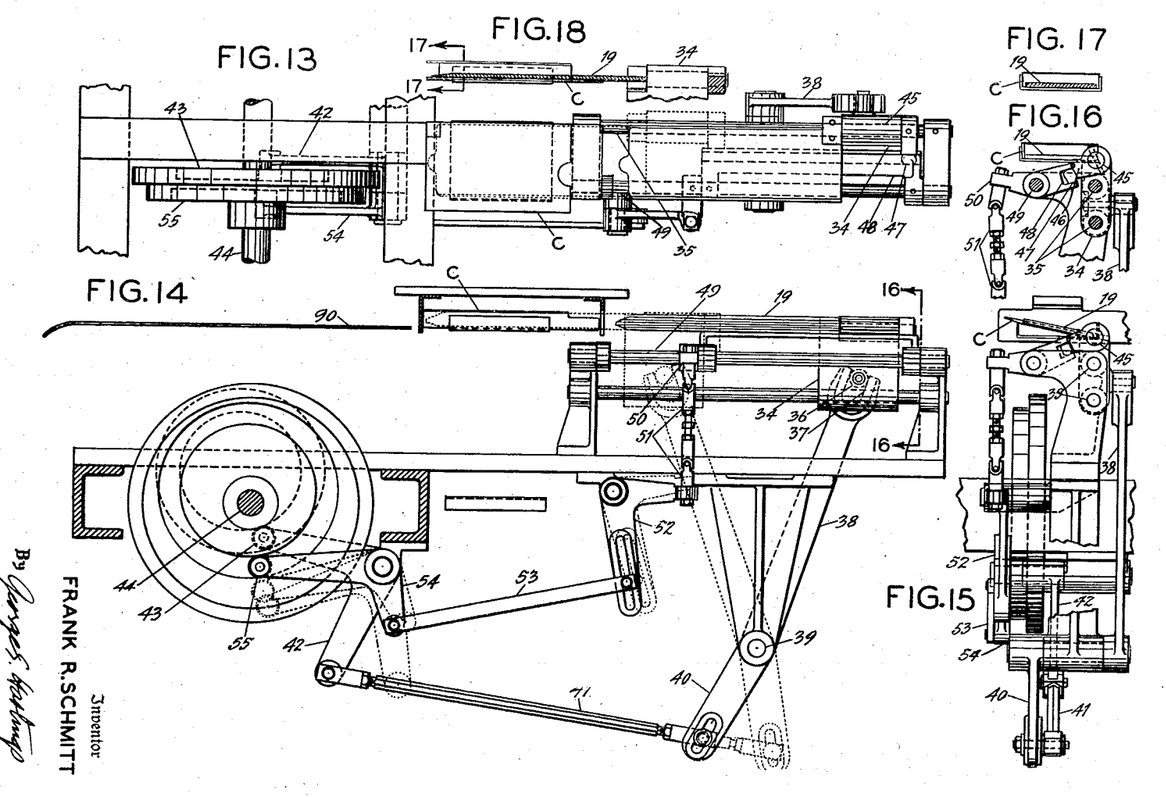
Fig. 13 is a plan view of the carton opening mechanism.
Fig. 14 is an end elevation partly in section of the carton opening mechanism shown in Fig. 13.
Fig. 15 is a detail side elevation partly broken away of the mechanism shown in Fig. 14.
Fig. 16 is a side elevation of a detail of the mechanism shown in Fig. 13.
Fig. 17 is a detail view taken on the line 17—17 of Fig. 18, showing a section through the carton opening blade.
Fig. 18 is a detail sectional view of a part of the mechanism of Fig. 13.
Figures 50, 52:
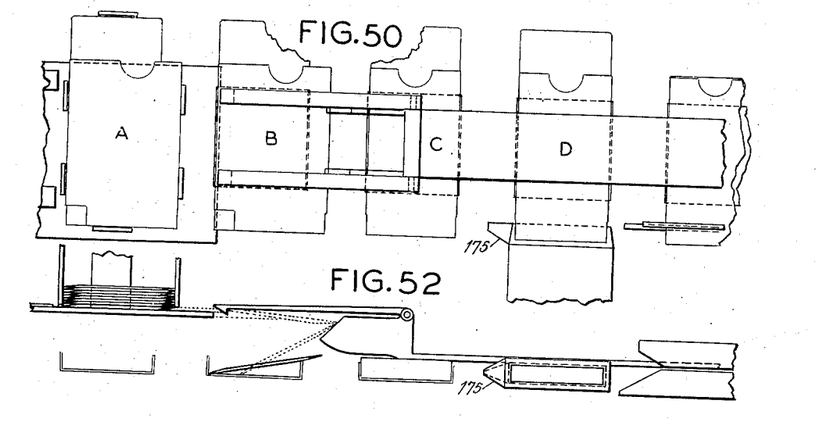
Fig. 50 is a detail plan view showing the operating stations A, B, C and D of the mechanism for feeding and opening the cartons.
Figs. 52–53 are side elevations respectively of the detail shown in Figs. 50 and 51.
Figure 51:
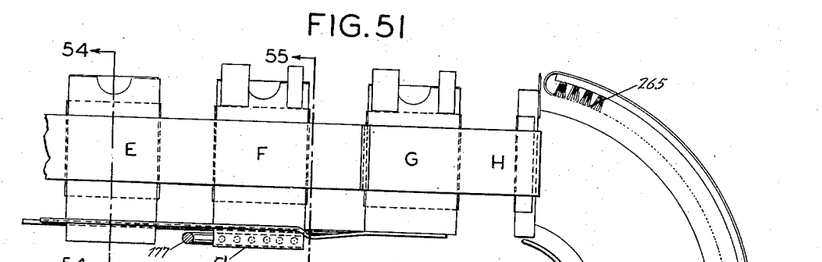
Fig. 51 is a view also in plan elevation illustrating the continuation of Fig. 50 showing stations E, F, G and H of the cartoning mechanism.

The cartons in the pockets 5 supported on the conveyor chain 18 are indexed forwardly to the carton opening station where a knife 19 is pushed along the lower flap of the carton and into the same whereupon the knife is given a twist from the position shown at the top of Fig. 15 to the position shown in Figs. 16 and 17 to thereby open the carton by reason of the opposing push of the knife and of the forward side 5a of the pocket. The blade is then withdrawn to permit the conveyor pocket to be indexed to the next cigar inserting station D (Fig. 50).

Figures 1, 2:
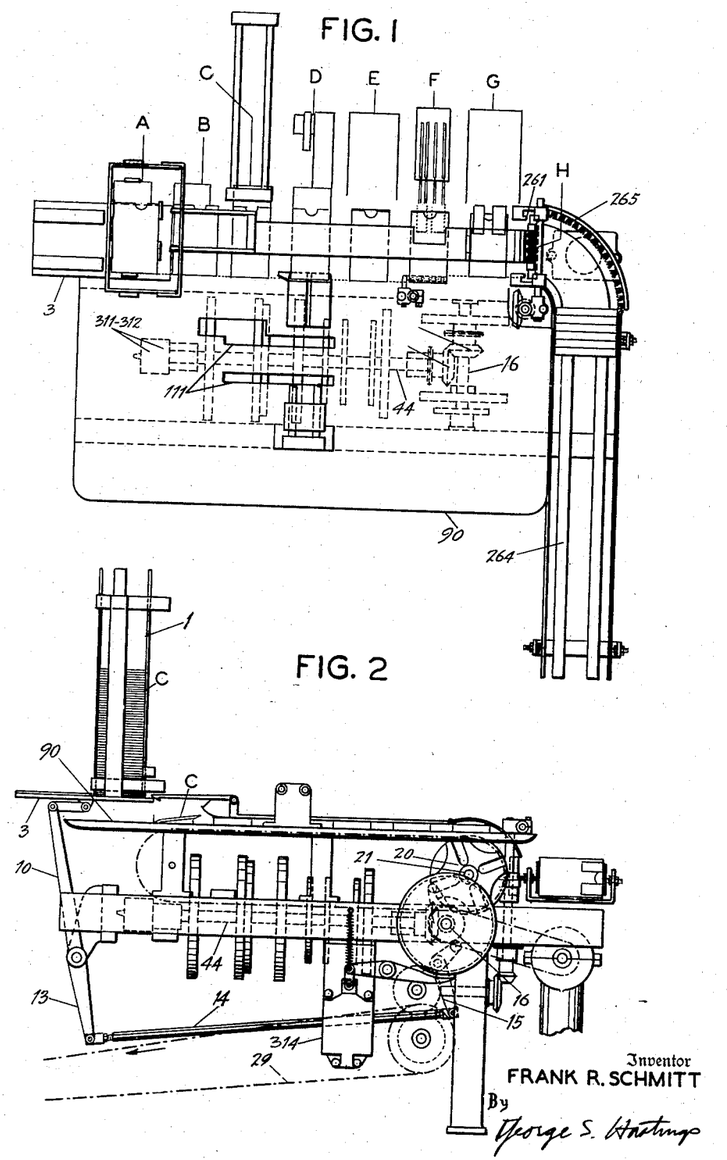
Fig. 1 is a plan view of the improved cigar packing machine illustrating particularly the arrangement of the carton opening and feeding parts.
Fig. 2 is a view in side elevation of the mechanism shown in Fig. 1.
Figure 3:
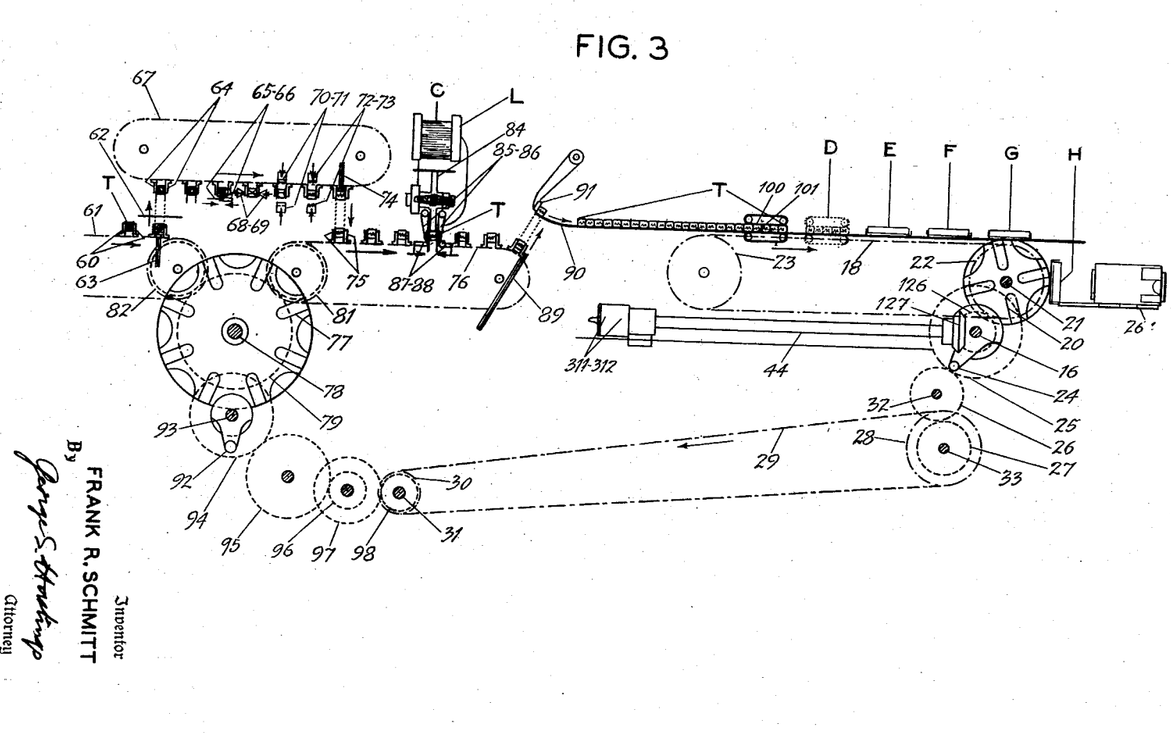
Fig. 3 is a diagrammatic view in side elevation illustrating the connection between the mechanism illustrated in Fig. 1 and a cigar banding and wrapping machine.

The carton conveyor chain 18 is indexed intermittently from station to station by a Geneva wheel 20 secured to the shaft 21 on which is mounted the sprocket 22 (Fig. 50) carrying the chain 18, the other end of which chain is carried by the idler sprocket 23 (Fig. 3). The Geneva wheel is driven by the co-acting crank and pin 24 from the shaft 16 which shaft is driven through gears 25, 26, 27, sprocket 28 and chain 29 running over sprocket 30 on a main drive shaft 31. Gears 26 and 27 are suitably journaled on shafts 32 and 33. The shaft 33 also carries the sprocket 28.

The knife 19 (Figs. 14-18) is given its reciprocating movement on a slide 34 mounted on rails 35 and connected by a pin 36 with a fork 37 in a lever 38 pivoted on a shaft 39 connected by a lever 40, link 41 and a bell crank lever 42 to the cam 43 on the cam shaft 44. The timing of this cam is such that the knife is inserted while the conveyor is at rest with a carton at station B (Fig. 50).

The knife 19 is twisted in the carton by means of a shaft 45 (Fig. 13) secured to one end of the knife and carrying a lever 46 (Fig. 16) having at its outer end a roller 47 engaging in a fork 48 which fork is pivoted on a shaft 49. This fork lever is oscillated through a lever 50 connected by suitable linkage 51 to a bell crank lever 52 actuated in turn through link 53 by lever 54 engaging cam 55. The cam 55 is so timed that the knife 19 is given its twisting movement at the end of the knife inserting movement of the slide 34 (Figs. 13-14).

At station D a predetermined number of cigars which in the particular embodiment illustrated have been banded and individually wrapped, are supplied in position for insertion in the carton (Figs. 44, 45, 46, 50).

The present cartoning mechanism is designed for co-action with mechanism for individually wrapping and in some instances, banding cigars so as to operate in synchronized relation therewith and so as to prevent loss of position of the cigars which may have bands or printed material which must be the same side up in the carton to produce a marketable package. The relationship of the cartoning mechanism to said banding and wrapping mechanism will now be described.

In the particular embodiment illustrated, the wrapped, and if so desired, banded cigars are supplied by wrapping and banding machines such as that disclosed in the application of Joseph A. Neumair, Serial Number 629,595, filed August 22, 1932, issued on April 20, 1937, as Patent Number 2,077,431. In this type of machine as illustrated in Fig. 3, the cigars T are carried in grippers 60 on a conveyor chain 61 from which each of the cigars is pushed into a wrapper 62 which is folded about three sides of the cigar by the plunger 63 pushing the wrapper into grippers 64 as shown at the left hand side of Fig. 3. While held by these grippers 64 the depending edges of the wrapper are lapped by the lock seam folders 65 and 66. At another station of the conveyor 67 which carries the grippers 64, the tubular projecting end portion of the wrapper is tucked at opposite sides to plicate the wrapper ends, this being accomplished by two oppositely movable tuckers 68 and 69. The plicated end portions of the wrapper projecting beyond the cigar ends are next folded by being compressed between suitably formed folder blocks 70 and 71 which crease and fold the wrapper ends. The folded ends are next crimped to secure them in folded and closed position by corrugated crimper blocks 72 and 73 which are moved from opposite directions on the wrapper end portions. The several wrapping, tucking, folding and crimping operations referred to are fully described in detail in the patent of Neumair above referred to. The cigar T is then ejected by an ejector 74 which may have means for retaining the cigar against falling as shown in the application above referred to, which carries the cigar into the grippers 75 on a conveyor chain 76. The conveyor chain 76 as well as the chain 61 are both indexed in proper timed relation to the wrapping and banding parts through a Geneva wheel 77 mounted on a shaft 78 which shaft carries a gear 79 engaging with gears 82 and 81 carrying suitable sprockets and the chains 61 and 76. This Geneva wheel 77 is driven by a crank pin 92 mounted on a shaft 93 driven through gears 94, 95, 96, 97 and 98 from the main drive shaft 31. The cigars T in the grippers 75 may be banded as they travel towards the cartoning mechanism by a suitable banding mechanism L. This banding mechanism includes a suction turret 84 which receives bands from a band magazine, not shown, and carries a moistened band into a position overlying the cigar T under the same. A pair of folders 85 and 86 serves to fold the bands along the vertical sides of the cigars and hold the band in U formation about the cigar while the folders 87 and 88 act successively, 87 operating first, to overlap the depending end portions of the band, all as set forth in detail in the above mentioned patent to Neumair. The cigars are then indexed forward on the chains 76 to a position overlying an ejector 89 which ejects the cigars into substantial alignment with the cigar runway 90 onto which the cigars are swept from the ejector by the lever 91, the cigars accumulating on this guide plate or feed table in face to face contacting row formation in the embodiment illustrated as shown in Fig. 3. It is from the forward end of this row of cigars that the group for insertion in the carton is taken.

Figures 4, 5, 6, 7, 8:
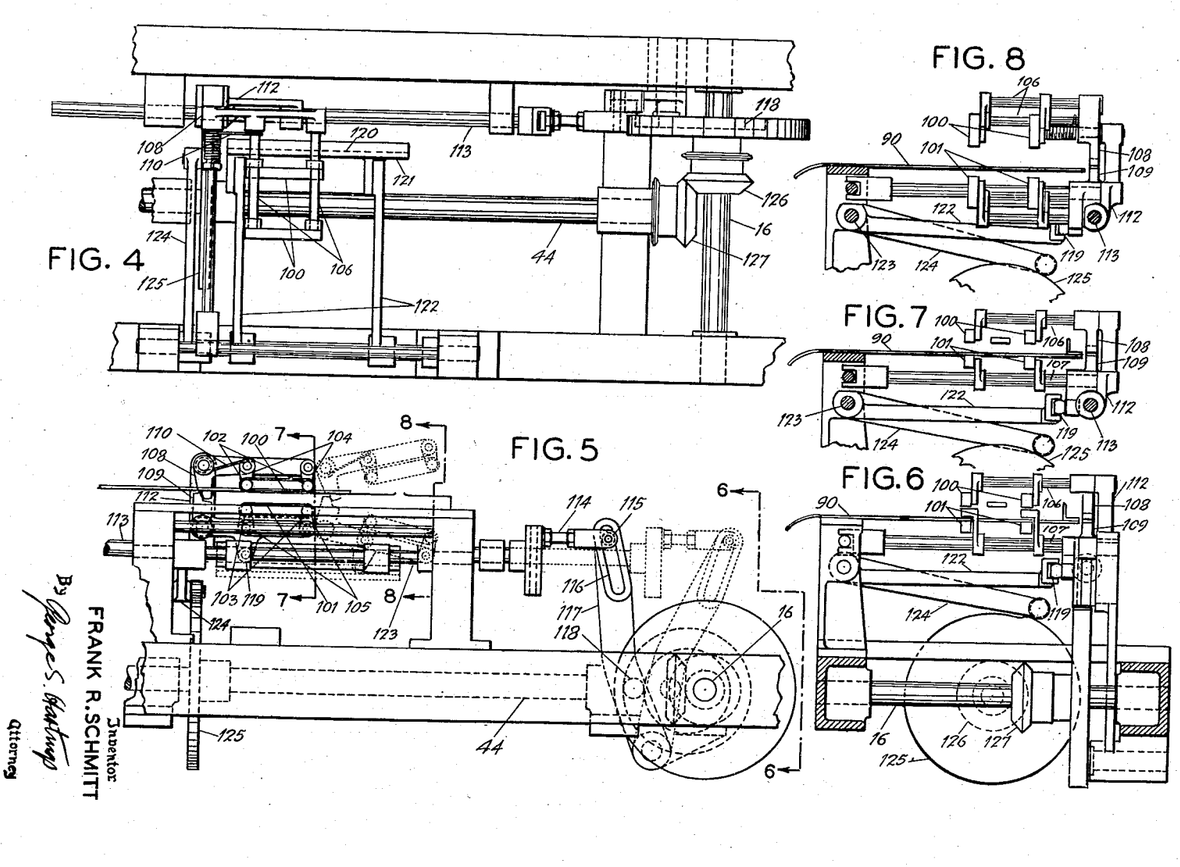
Fig. 4 is a plan view of the cigar separating and grouping device.
Fig. 5 is a view in side elevation of the device shown in Fig. 4.
Fig. 6 is a detail sectional view in end elevation on the line 6—6 of Fig. 5.
Fig. 7 is a detail end elevation partially in section on the line 7—7 of Fig. 5.
Fig. 8 is a detail sectional end elevation in section on the line 8—8 of Fig. 5.

Between station C and station D suitable means are provided for separating a group containing a predetermined number of cigars. This means includes a pair of grippers 100 and 101 consisting of a pair of bands which may be of rubber stretched over pairs of pins 102 and 103. Each of these pairs of pins is supported on arms 104 and 105 respectively, carried by rods 106 and 107 respectively which rods are carried by upper and lower levers 108 and 109 (Figs. 6 and 7). These levers are interconnected for opposite and equal movement by projecting lug portions having a notch in one engaging a shoulder of the other, the upper lever being held in operating contact with the lower lever by means of a spring 110 so that operation of the lower lever operates the upper lever.

The grippers 100 and 101 are mounted for movement transversely of the cigars at the forward end of the row on the plate 90 in slots 26 in said plate being mounted for this purpose on a carriage 112 attached to a slide rod 113 given reciprocating movement by a shackle 114 secured to the rod 113 and carrying a pin 115 in a slot 116 of the oscillating cam lever 117 driven by the cam 118 on shaft 16.

Figure 44:
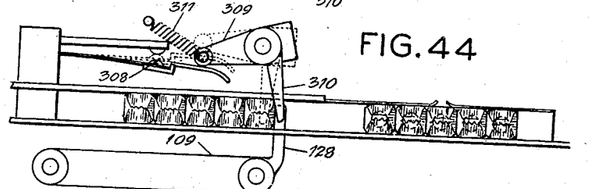
Fig. 44 is a detail side elevation showing a safety device starting the cigar cartoning mechanism when a predetermined number of cigars are in position to be cartoned but not before.

The grippers 100 and 101 are so operated as to close on the first five cigars in the row of cigars as shown in Fig. 3 and by reason of the reciprocating movement just referred to they carry the five cigars away from the forward end of the row at a rate of travel greater than the normal feeding movement of the row so as not to interfere with the accumulation of another five cigars in position to be grouped and separated, during the inserting of the first mentioned group in the carton. To produce this grouping operation, a roller 119 (Fig. 7) secured to the lever 109 engages in a groove 120 (Fig. 4) in a crossbar 121 carried by a pair of levers 122 secured through pivot shaft 123 to cam lever 124 engaging cam 125 on shaft 44. Shaft 44 constituting one of the principal cam shafts extending lengthwise of the machine is driven from the shaft 16 through bevel gears 126 and 127. Thus operation of the cam 125 causes a lifting of the lever 109 bringing together the grippers 100 and 101 on the foremost cigars of the row which are stopped by suitable stops 128, presently to be described, as shown in Fig. 44.

At the forward end of their movement in the grippers 100 and 101, the group of cigars is in axial alignment with the open carton C at the station D. At this position, it will be remembered that the grippers 100 and 101 are open. A reciprocating plunger element 130 engages the left hand end of the group of cigars (see Figs. 19 and 20) and moves the cigars to the right into a compressing and guiding funnel 131 by which the cigars are guided into the carton C after being sufficiently compressed in a horizontal direction to pass the mouth of the carton.

The inserting plunger 130 is supported by a bracket 132 on an adjustable rod 133 secured slidably in a clamp 134 in which the rod may be secured in desired position by a thumb screw 135. The clamp 134 is secured to a block 136 slidably mounted on rails 137 on which the block is reciprocated by means of a link 138 connected to a lever 139, this lever being oscillated through a shaft 140 and lever 141 which lever is connected by a rod 142 to a cam roller 143 in a cam groove 144 of the cam 145 on the shaft 44. For the purpose of supporting the end of the rod 142, a block 146 is journaled on the shaft 44 and is received in a fork 147 secured to the end of said rod 142.

The funnel 131 comprises upper and lower plates 150 and 151 and a pair of hinged side plates 152 and 153 hinged on pintles 154 and 155. The ends of the hinged plates 152 and 153 are stopped in a position with their ends substantially in alignment with the edges of the vertical side walls of the carton so that the cigars are guided into the carton without catching on said edges. It will be noted that the plates 152 and 153 form a tapered funnel toward the mouth of the carton.

Figures 19, 20, 21, 22:
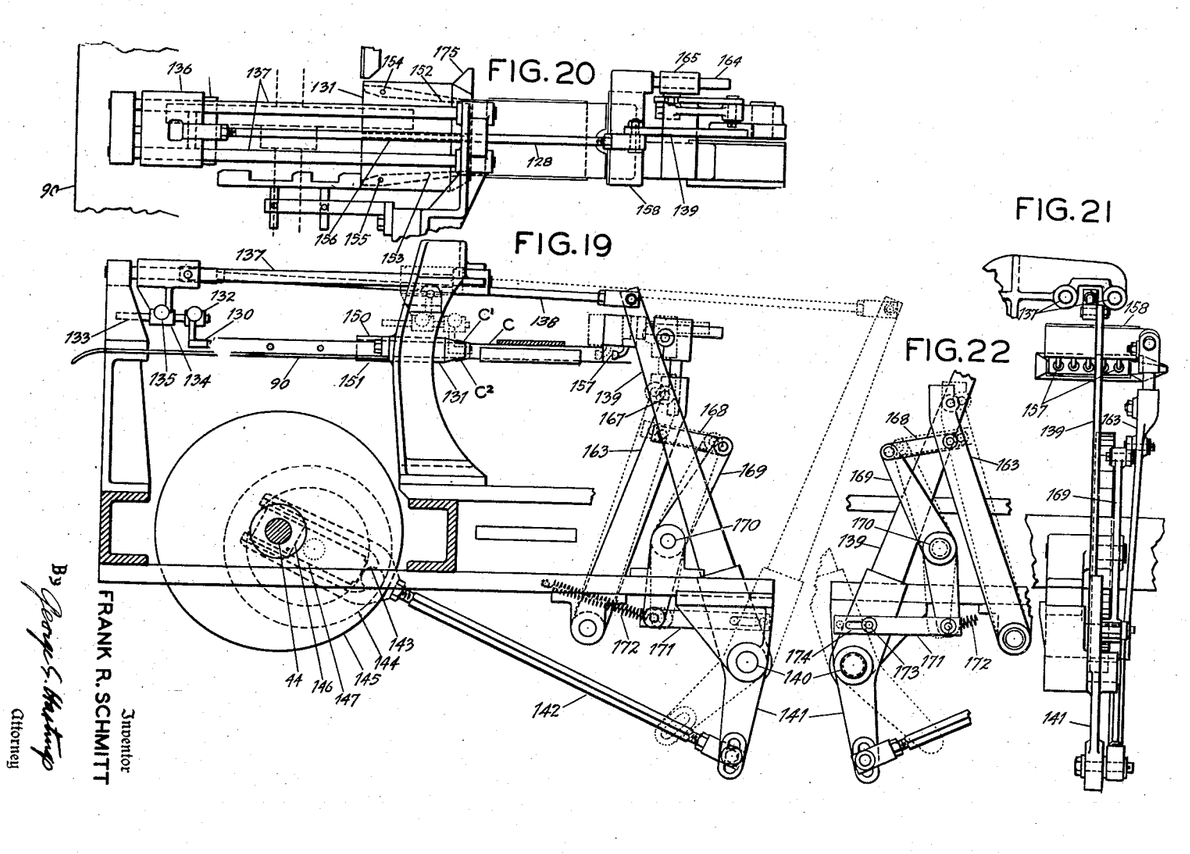
Figure 46:
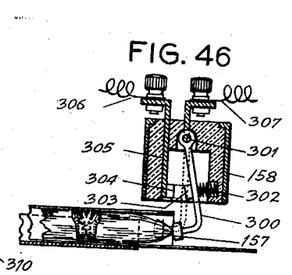
Fig. 46 is a detecting device for preventing operation of the cartoning mechanism when defective or short count groups of cigars are supplied.

The cigars pushed into the carton C by the plunger 130, which is admitted within the funnel by means of an opening of slot 156 in the top of the funnel, are brought up against a series of stop elements 157 corresponding in number and spacing to the cigar ends which yield to the pressure of the cigars provided they are of normal length and firmness (Figs. 22 and 46). Each of the stops 157 which are yieldably mounted as shown in Fig. 46 will open a circuit, the circuits of each stop being in series with the others so that the circuit as a whole will be open only when all of the stops 157 are pushed in, as shown in Fig. 46.

The circuit will be described in more detail at a later part of this specification.

The stops 157 are carried to operative position within the right hand end of the carton as shown in Figs. 19 and 20, by means of a box 158 within which the stop carrying rods 300 (Fig. 46), are movably mounted in the box, these rods being spring pressed toward cigar engaging position (Fig. 46) by means of springs 302, the box as a whole being given a to and fro movement on a lever 163 (Figs. 19 to 22), on which the box is adjustably secured for both horizontal and vertical adjustment by means of a stem 164 in a clamp block 165 (Fig. 20), which block is in turn secured by stem 166 in a second clamp 167 on the lever 163. This lever is oscillated through a link 168 connected to a lever 169 pivoted at 170 and connected by a link 171 having a pin and slot connection to the lever 139. A spring 172 biases the lower end of the lever 169 toward the lever 163 for the purpose of biasing the box away from the right hand end of the carton except when in operative position. The timing of the operation of lever 163 is such that the box 158 is moved to carry the stops into cigar end engaging position after a carton has arrived at station D and after the lever 139 has moved part of its operative stroke to insert the cigars in the carton. After the lever 139 has operated to nearly complete insertion of the cigars, the pin 173 strikes one end of the slot 174 (Fig. 22), showing a view from the opposite side from that in Fig. 19, thus operating the box in desired timed relation to the insertion of the cigars.

It will be seen from Figs. 50 to 55 and Fig. 23 that the carton employed is provided with a hinged flap having a tongue at one end of the carton and a pair of bottom flaps at the other end of the carton through which the cigars have been inserted. For the purpose of maintaining these bottom flaps C1 and C2 open during the cigar inserting operation the rear side of the funnel 131 adjacent the carton is provided with a tapered plow portion 175 which enters between the flaps C1 and C2 and spreads them apart as shown in Fig. 19 so that the flaps themselves assist in guiding the cigars into the carton.

Figures 32, 34:
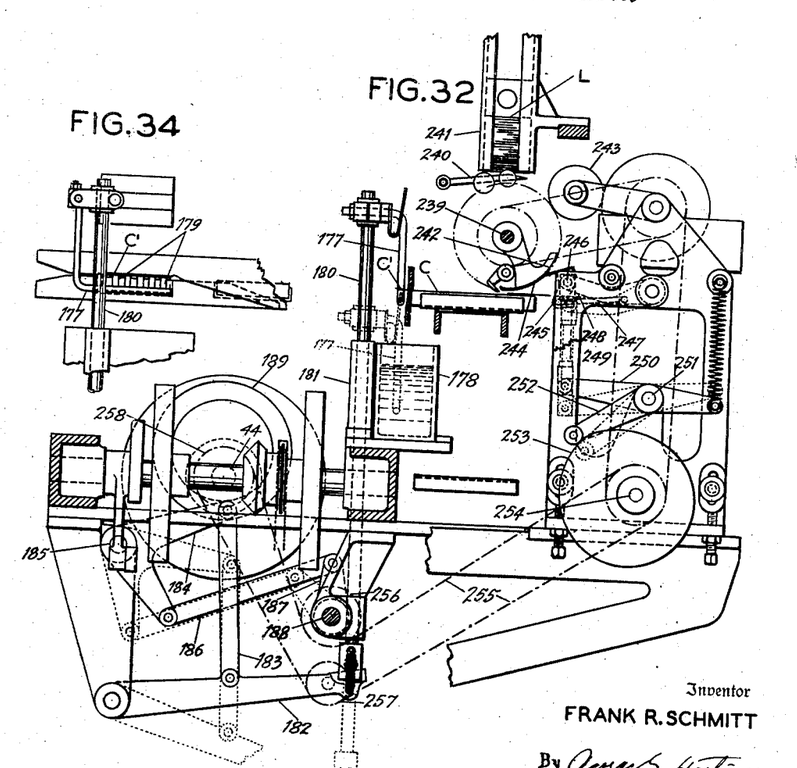
Fig. 32 is an end elevation partly in section of the stamping mechanism for applying stamps to the closed carton and also means for making the final closure of the carton.
Fig. 34 is a detail side elevation of the carton closing mechanism shown in Fig. 32.
Figures 53, 54, 55:
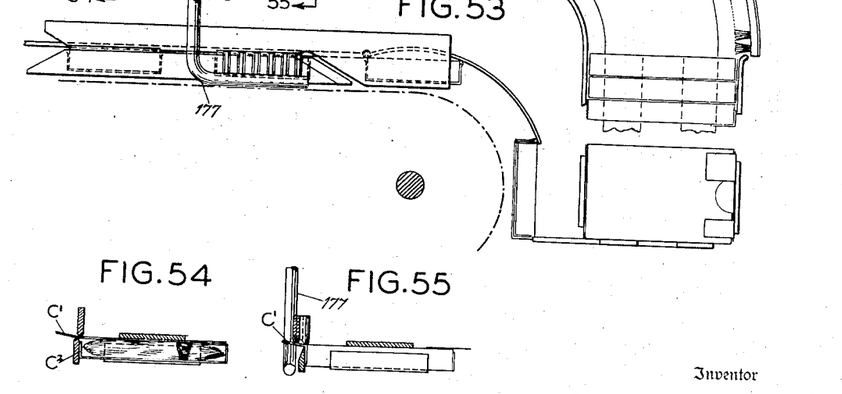
Figs. 54–55 are detail sectional views taken on the lines 54—54 and 55—55 respectively of Fig. 51.

After the carton has been filled, it is indexed on the carton conveyor to the station E at which station the inclined folder plate 176 folds in flap C2. The carton is next indexed to station F, where glue is applied to the inside of the flaps C1 by means of a glue applying grid 177 which has a vertical movement from a position in a glue pot 178 to upper position where fingers 179 of the grid place glue spots on the flap C1 as shown in Fig. 32. This grid is given its vertical movement by means of a plunger 180 slidable in a bracket 181, the plunger being supported on a generally horizontal surface of a push lever 182 operated through link 183 from a bell crank lever 184 pivoted at 185 and connected through a link 186 to a crank 187 on the shaft 188. The bell crank receives its motion for operating the push rod 180 from a cam 189, this bell crank through the linkage just described serving to oscillate the shaft 188 for a purpose which will presently appear. The glued flap C1 is then folded by an inclined fold plate 190 (Fig. 53).

Figures 26, 27, 28, 29, 30, 31:
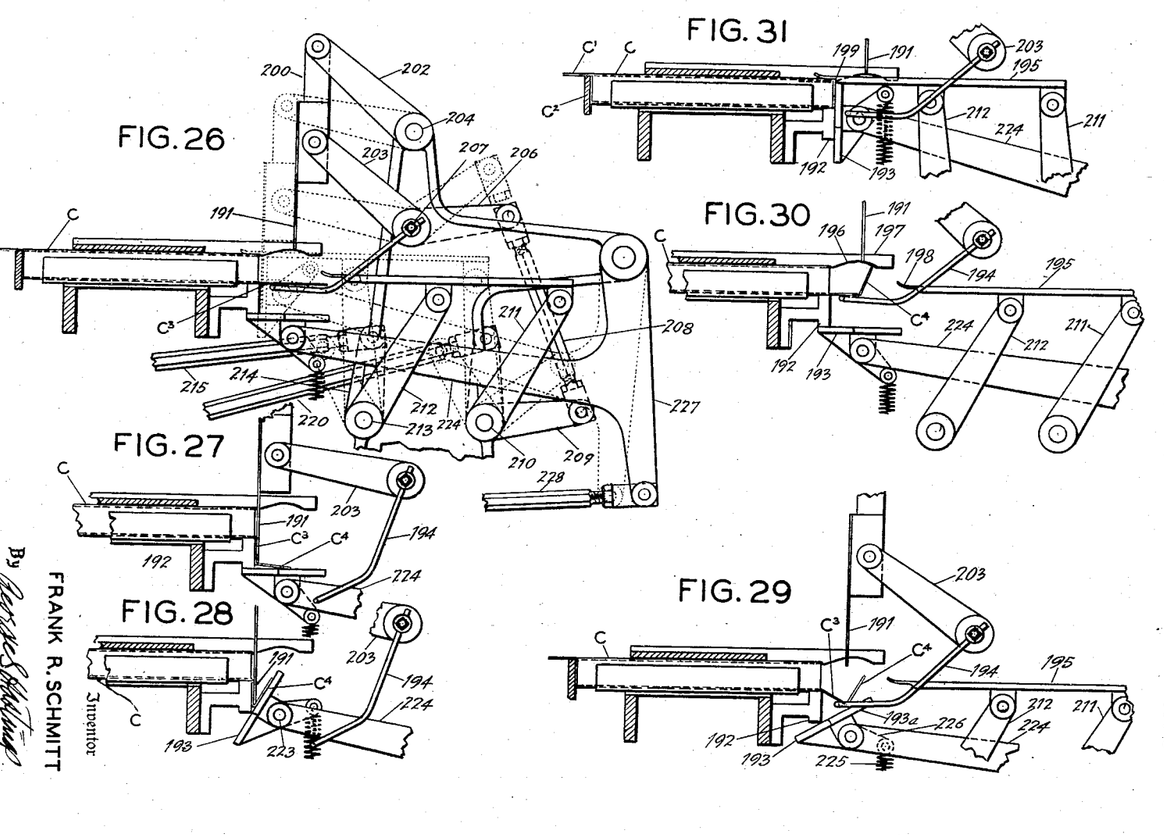
Figs. 26, 27, 28, 29, 30 and 31 are detail sectional views in end elevation showing different operations performed by the parts shown in Fig. 23.

At station E devices are provided for folding and inserting the top tongue carrying flap of the carton, these devices being best shown in Figs. 26 to 31. As a carton is received from the carton feed in the pocket of the carton conveyor, the tongue flap C3 is projecting horizontally. This tongue is ordinarily pre-scored in the positions along which it is to be bent during manufacture of the cartons which facilitates the folding and tongue inserting operations. With the tongue in the position shown in Fig. 26, a plate 191 is given a downward and inward vertical movement from the position shown in Fig. 26 to the position shown in Fig. 27 which breaks the hinge of the flap C3 over the corner of the block 192 and by engagement of the tongue portion C4 with the horizontal plate 193 also serves to bend the tongue C4 at right angles to said flap C3, as shown in Fig. 27. This tongue portion C4 is then bent sharply upward by swinging of the plate 193 as shown in Fig. 28. This plate 193 is then withdrawn which permits the flap C3 to spring back. In case this flap does not swing sufficiently high, a lifter wire 194 is caused to engage the lower side of the flap to lift the same into position for engagement of the flap C4 by a tongue inserter plate 195. This plate has a generally horizontal but slightly upward motion against the external side of the tongue C4 (Fig. 30) swinging the tongue inwardly about its hinge line along the curved surface 196 of the bar 197 thereby guiding the tip of the tongue under the upper wall of the carton. As shown in Fig. 31 the plate 193 appears carried upwardly against the back of the flap C3. As it rises, its left hand corner (see Fig. 29) strikes the block 192 which swings the plate to vertical position causing its heel portion 193a to push the top of the flap horizontally toward the carton to complete the insertion of the tongue C4. To prevent catching of the tongue edge against the upper wall of the carton, the guide surface 196 extends to a point a little below or level with the inner surface of the upper wall. During this operation the plate 195 is moved to the position shown in Fig. 31 with the curved extension 198 passing over the upper corner of the carton and at the same time guarding the tongue at that point. A shoulder 199 at the base of the extension 198 bears on the hinge line of the tongue and aids in inserting the tongue.

Figures 23, 24, 25:
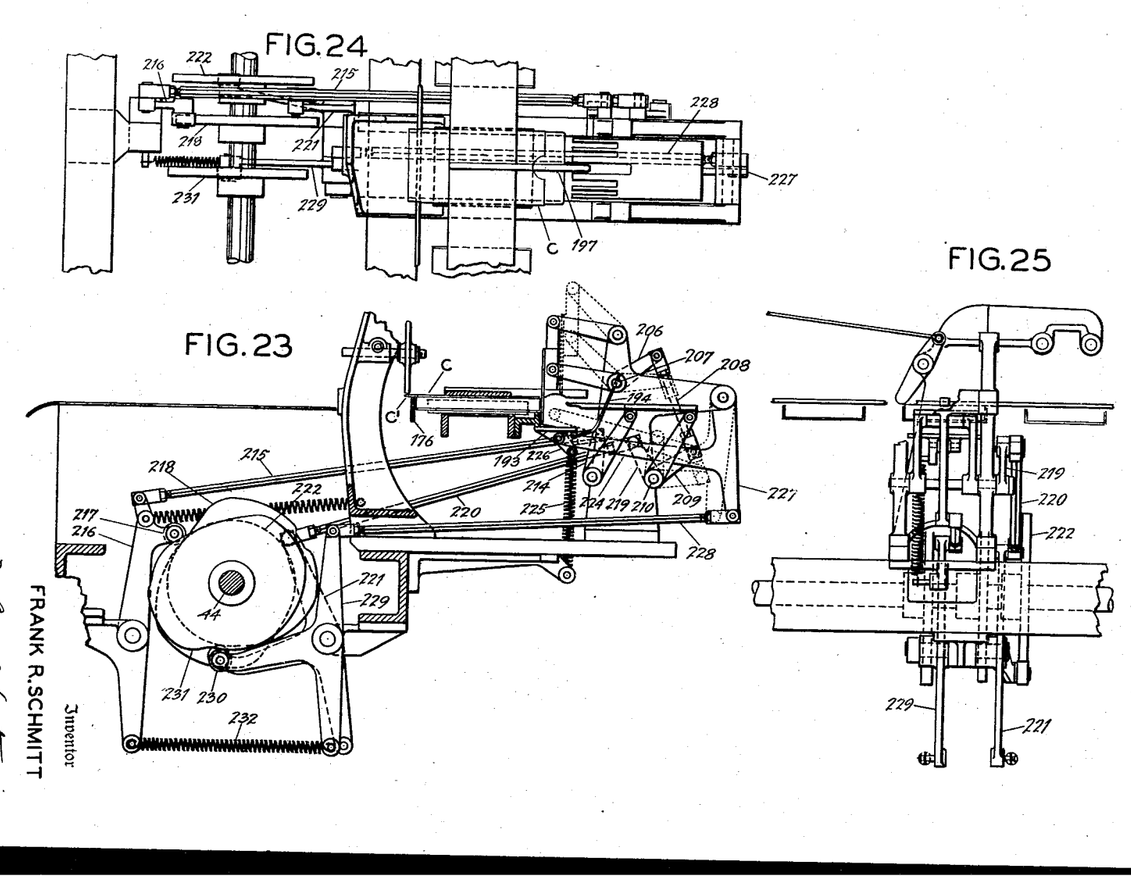
Fig. 23 is a sectional end elevation of the carton closing mechanism.
Fig. 24 is a plan view of the device shown in Fig. 23.
Fig. 25 is a side elevation of the device of Fig. 23.

The plate 191 for bending the flap C3 is given its vertical movement by parallel link devices (Fig. 26) consisting of a link 200 to which the blade is secured, which link is carried in vertical position by a pair of parallel links 202 and 203 carried by pivots 204 and 207 and given to and fro movement by a lever 206 connected to shaft 207 on which the lever 203 is secured. Lever 206 is connected through link 208 to a lever 209 fast to the shaft 210 which shaft carries the tongue inserting plate 195 through a lever 211 loosely mounted on shaft 210. The plate 195 is also supported by lever 212 on shaft 213. The shaft 213 is rocked by crank 214 through a link 215 which link is secured to a cam lever 216 having a roller 217 engaging a cam 218 on the cam shaft 44 (Fig. 23).

The plate 195 is given its to and fro motion by means of a crank 219 secured to the shaft 210 and connected to the link 220 which is operated through cam lever 221 by cam 222 mounted on the shaft 44. The flap lifting wire 194 derives its motion from the shaft 207 to which it is adjustably secured.

The tongue folding plate 193 is pivotally mounted (Fig. 28) at 223 on the arm 224 on which arm it is normally pulled with its heel part 193a (Fig. 29) down against the lever 224 by a spring 225 acting on a lever 226 attached to said plate. This arm 224 is given a vertical to and fro movement which causes the forward end of the plate 193 to strike the block 192 thereby swinging the plate as already described and shown in Fig. 28. After moving to the position shown in Fig. 28, and partially folding in the tongue, the arm 224 is again lowered to the position shown in Fig. 30 and is again lifted vertically to the position shown in Fig. 31 in which the block 192 has swung the plate to vertical position so that the heel portion in its swinging movement has pushed the tongue into the package and has swung the flap C3 to closed position. The arm 224 is given the movements just described by means of a lever 227 (Fig. 26) of which the arm is a part, which lever is rocked by means of a link 228 connected to a cam lever 229 (Fig. 23) having an extension carrying a cam roller 230 engaging the cam 231. This lever is held with the roller in contact with the cam by means of a spring 232.

At station F, the revenue stamp and an advertising or other identifying label is applied to the closed tongue end of the carton, by any suitable stamping means, such for instance as that illustrated somewhat diagrammatically in Fig. 32. This stamping means may be of the type illustrated in United States patent to P. M. Nejedly, No. 1,682,406, dated August 28, 1928, for a "Package stamper."

Figure 33:
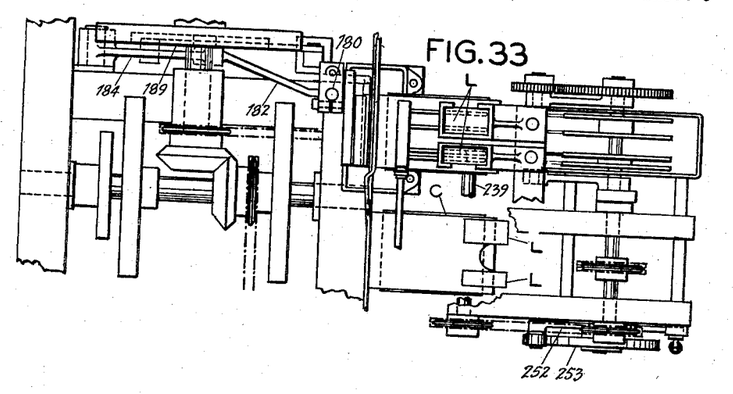
Fig. 33 is a plan view of the preceding.

In this type of stamper, stamp pickers 240 withdraw a stamp L from the stamp magazine 241 into operative engagement with a stamp carrier wheel 242 on shaft 239, which by stamp gripping means such as shown in the Nejedly patent, carries the stamp into contact with a paste wheel 243 and then into a position overlying the carton C where stamp applier fingers 244 push the moistened stamp into contact with the carton, the stamp being so applied that the end of the stamp projects over the end of the carton as shown in Fig. 33. The fingers 244 are suitably operated in timed relation to the movement of the carrier wheel 242 by means of a lever 245 carrying said fingers, which lever is pivoted on a pin 246 and is spring pressed by a spring 247 into engagement with a push lever 248 which is given vertical rocking movement by a link 249 connected to a lever 250 on shaft 251 which shaft is rocked by a cam lever 252 engaging cam 253 on shaft 254. This shaft is driven by a chain 255 passing over idlers 256 and 257 and a sprocket 258 on the cam shaft 44.

Figures 36, 37:
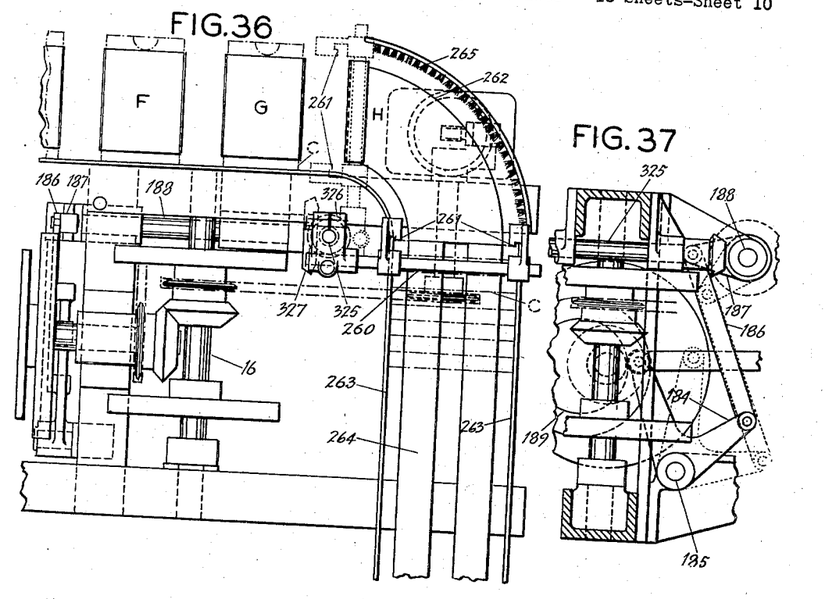
Fig. 36 is a plan view of the preceding.
Fig. 37 is a sectional end elevation of the preceding.

After passing through an idle station G, the closed and partially stamped carton arrives at a delivery station H which station is at a position on the conveyor chain 18 in which the carton is turned ninety degrees around the sprocket 22 and is therefore in vertical position. It will be remembered that the collapsed cartons were forced into open position in pockets of the conveyor in which pockets the cartons have a close enough fit to stick while at the same time the vertical walls of the pocket hold the carton in open position. At the station H the carton is held in the position shown in the right hand of Fig. 3 by the friction of the pocket walls on the carton. A swinging ejector arm 260 (Fig. 36) is provided which has a pair of carton engaging lugs 261 which are located behind either end of the carton at the time the carton is indexed to station H. The arm 260 is then given a ninety degree clockwise movement as shown in Fig. 36 from dotted line to full line position which sweeps the carton along the curved portion 262 into the straight portion 263 of the chute 264. As the carton is swept along the curved chute portion 262, it is engaged by the brush 265 which lays the stamp over the end flap C4, thus completing the stamping operation. The cartons accumulate in a solid row in the magazine 264 which by reason of its position at right angles to the remainder of the machine does not materially increase the floor space required by the machine.

Figure 38:
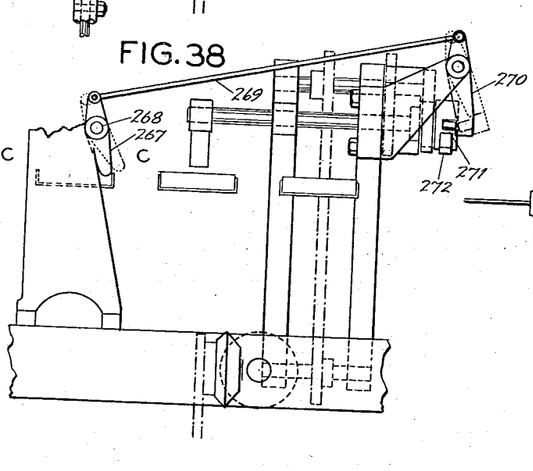
Fig. 38 is a side elevation showing a detail of the machine for preventing operation of the stamping device when no carton is fed.
Figure 39:
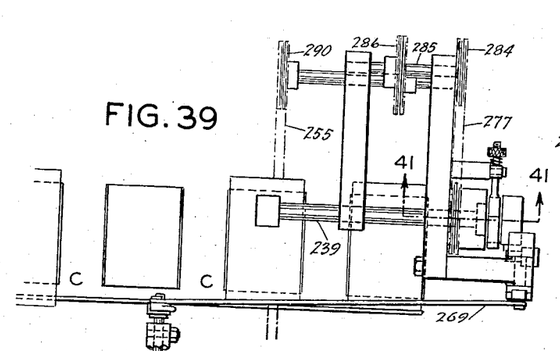
Fig. 39 is a plan view of the preceding.
Figures 40, 41, 42, 43:
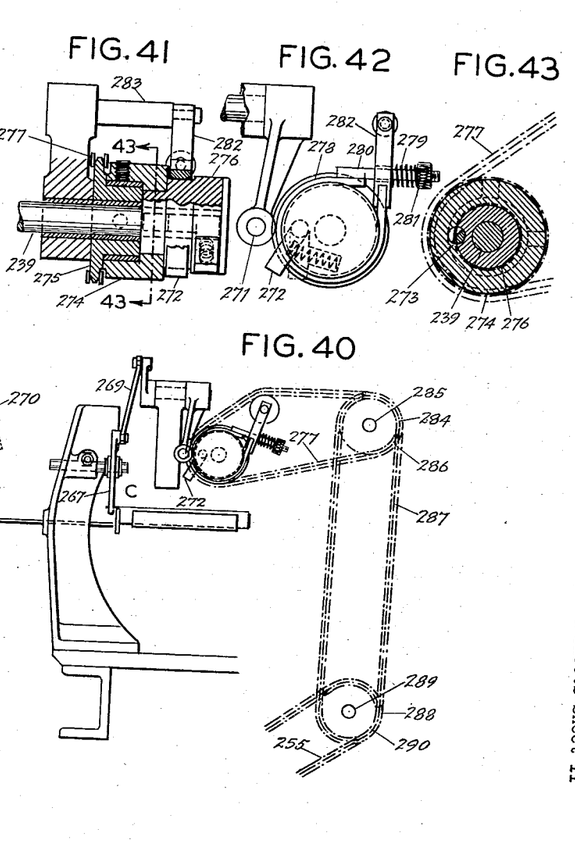
Fig. 40 is an end elevation of the same.
Fig. 41 is a sectional detail view on the line 41—41 of Fig. 39.
Fig. 42 is a view in end elevation of a detail shown in Fig. 39.
Fig. 43 is a sectional view on the line 43—43 of Fig. 41 showing a detail of the stamper clutch mechanism.

For the purpose of preventing waste of a revenue stamp or loss of a label when there is no carton in position to be stamped or labeled, means are provided for stopping the stamp wheel when no carton is in position to be fed to the stamper. This means includes a trigger 267 (Fig. 38) in the path of the end of a carton in the conveyor pocket and this trigger which is pivoted at 268 is connected by a link 269 to a lever 270 having a pin 271 which pin is only moved into position to engage a pawl 272 when there is no carton in position to engage the trigger. Engagement of the pin 271 with the pawl 272 swings a key 273 (Fig. 43) secured to the pawl out of keying position into a position which frees a sleeve portion 274 (Fig. 41) of a sprocket 275 from a driving sleeve 276 secured to the stamp wheel drive shaft 239. The sprocket 275 is driven constantly by a chain 277. For the purpose of bringing the stamp wheel to a quick stop when the stamp wheel is released from the drive, a brake band 278 engaging the sleeve 276 is provided which is under braking tension produced by the spring 279 which is coiled upon a pin 280 secured to the brake band and put under adjusted tension by a thumb screw 281 on said pin bearing against said spring. This brake band 278 constitutes one form of clutch available for controlling the operation of the machine and will be hereinafter designated by the term clutch where that generic designation is appropriate. The other end of the brake band is supported by a bar 282 through which the pin 280 passes, this bar being supported by a bracket 283. Chain 277 is driven through sprockets 284, shaft 285, sprocket 286 and chain 287 which in turn is driven from sprocket 288, shaft 289, sprocket 290 and chain 255.

The present machine is provided with means for preventing cartoning of defective or short count groups of cigars by stopping the machine, as mentioned above, and these means will now be described. The stop or feeler members 157 are movably mounted in the fibre-lined box 158, Fig. 46, on levers 300, which are pivoted at the top of the box on a pivot rod 301. These levers are spring pressed towards the cigar ends by springs 302 and on their levers, which are of electrically conducting material, are contacts 303 positioned to engage a corresponding series of contacts 304 on contact bar 305. Wire 306 connected to bar 305, and wire 307, connected to pivot rod 301, form a circuit which, through a rotary timing switch and a relay, controls the power circuit, the operation of which will presently be described.

Provision is also made to insure against the transfer of cigars from the delivery line until the line is full. The operation of this device is as follows.

Figure 45:
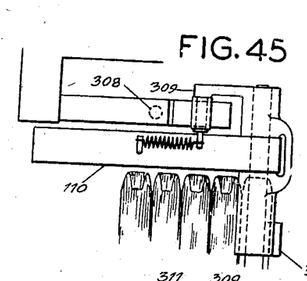
Fig. 45 is a plan view of the preceding.

A circuit breaker, 308, Figs. 44 and 45, is mounted on the delivery table 90 in position to be actuated by a lever 309 on transfer arm 110 (Fig. 45.) Lever 309 has a blade 310 reaching down below the top of the cigars and, unless the line of cigars is full up to stop 128 on transfer arm 109, lever 309, which is held in an inoperative position by spring 311, will not affect circuit breaker 308. As the cigars advance to stop 128, the cigar first in line engages blade 310 forcing it ahead and causing lever 309 to depress circuit breaker 308, thus opening a circuit which, through a rotary timing switch and a relay, controls the clutch circuit, the operation of which will presently be described.

Figure 47:
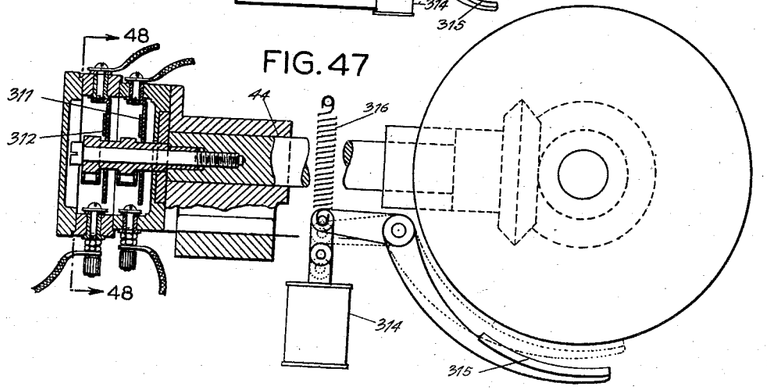
Fig. 47 is a view in side elevation showing the electrical timing means for co-action with the safety and detecting mechanisms of Figs. 44 and 46.
Figure 48:
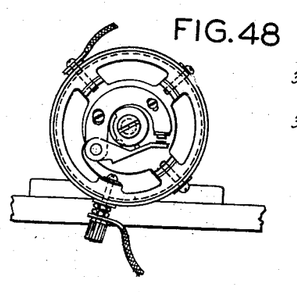
Fig. 48 is a view on the line 48—48 of Fig. 47.
Figure 49:
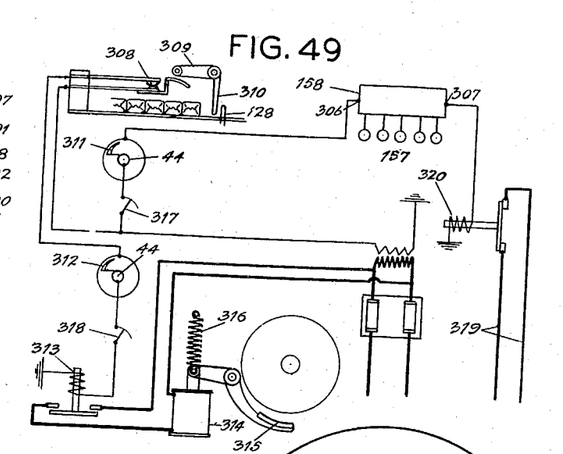
Fig. 49 is a diagrammatic view showing the electrical connections involved in the mechanisms of Figs. 44, 46 and 47.

The electric wiring diagram is shown in Fig. 49. The motor power circuit is controlled by the fibre lined box 158 which acts as a circuit breaker, as previously described, in a circuit passing through rotary timing switch 311, mounted on shaft 44 which makes one revolution per cycle of the machine, and is set so as to close the circuit at the moment the cigars normally bear on all the feelers 157 in the circuit breaker. The details of switches 311 and 312 are shown in Fig. 47.

If the proper number of cigars have been inserted, the circuit is broken and the normally closed relay 320 is not energized, thus leaving the motor circuit 319 closed. If one or more cigars less than the required number have been inserted into the carton, the circuit breaker remains closed and, as timing switch 311 makes contact, relay 320 is energized and motor circuit 319 opened.

The motor is thus stopped and the machine "shut down."

This will occur also if the carton contains a cigar defective in length, or having an end so soft that it yields to the bias of the corresponding spring 302 which influences the rod 300 and stop 157, so that the circuit of relay 320 is closed.

The clutch control circuit is operated from circuit breaker 308, previously described, in a circuit passing through a rotary timing switch 312 and a relay 313. These parts are connected in series and function as follows.

While circuit breaker 308 remains closed the normally open relay 313 becomes energized, as switch 312 makes contact, thus closing the clutch operating circuit, energizing solenoid 314, which throws clutch operator lever 315 into engagement, causing the machine to stop. The switch 312, which is mounted on shaft 44 remains in closed circuit position until the cigars, on delivery table 90, push on blade 310 and lever 309 breaks contact 308, thus opening the circuit and de-energizing relay 313, causing a break in the clutch operating circuit. The clutch operating circuit having been broken, solenoid 314 becomes de-energized, permitting clutch operator lever 315 to be brought into clutch released position by spring 316, thus again starting the machine.

Switches 317 and 318 are introduced into the circuits for the purpose of placing the respective circuits under the manual control of the operator of the machine.

Figure 35:
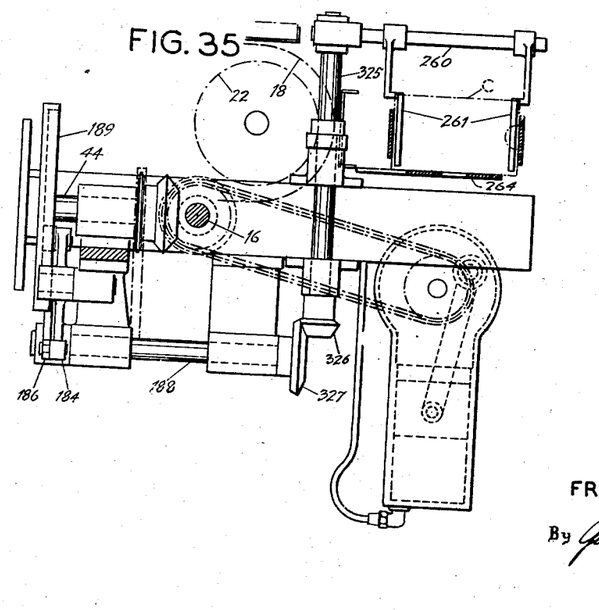
Fig. 35 is a side elevation illustrating the carton delivery mechanism.

It will be noted that due to the arrangement of the delivery chute 264 transversely of the conveyor 18 the cartons, through the swinging movement of the arm 260, are stacked crosswise of the length of the machine resulting in a considerable saving of floor space. This swinging movement of the arm 260 is produced (see Figs. 35, 36 and 37) by a shaft 325 carrying said arm and oscillated through gears 326 and 327 from the oscillating shaft 188.

From the foregoing it will be seen that a machine has been provided which is capable of coaction with banding and/or wrapping mechanisms for cigars and other articles of that type to complete, without being touched by hand, all the wrapping and/or banding and cartoning operations necessary to the producing of a marketable package or carton of such articles. In this connection it is noted that the use of the bottom flaps and a cigar guiding funnel as already described prevents any catching of bands outside the wrapper when such are used, at the mouth of the carton.

Since the operation of the several parts of this machine has been described in detail in connection with the description of its parts, further description of its operation will be dispensed with in the interest of brevity.

What is claimed is:

1. The combination with mechanism for forwarding simultaneously a group of finished cigars to a transfer point, and therefrom as a group to a predetermined station, of sensing devices constructed and arranged to operate as a group at said station upon said group of cigars, to detect a discrepancy in the predetermined quantity of finished cigars in said group being forwarded, and individual sensing devices constructed and arranged to operate at said station upon the several cigars in said group, to detect local abnormalities in the quality of each cigar in the group, prior to further operation upon said group.

2. The combination with mechanism for forwarding simultaneously a group of finished cigars, of individual sensing means operable against a tip of each cigar, as it is forwarded, to detect a disconformity in length and/or in density thereof, and means, responsive to said detection, to complement the action of said sensing means.

3. A cigar-forwarding and sensing mechanism, having the features claimed in claim 2, in which another sensing device is provided, complemental to said axially acting detector, and adapted to detect, and afford an indication of a material discrepancy in the desired diameter of a cigar, at a selected stage in the fabrication thereof.

4. In a machine of the class described: the combination with mechanism for forwarding finished cigars; of means to incapacitate said forwarding mechanism at times; and sensing means adapted to control the operation of said incapacitating means, said sensing means being operable selectively upon, and by virtue of, the occurrence of, a disconformity in the predetermined quantity and quality of any given quantum of the finished cigars being forwarded.

5. In a machine of the class described: the combination with mechanism for forwarding finished cigars; of means to incapacitate said forwarding mechanism at times; and sensing means adapted to control the operation of said incapacitating means, said sensing means being operable selectively upon, and by virtue of, the occurrence of a disconformity in the predetermined quantity and quality of any given quantum of the finished cigars being forwarded; said sensing means being adapted to detect a quantitative disconformity in terms of a deficiency as to predetermined cigar diameter, and adapted to detect a qualitative disconformity in terms of required length, and also of required density of the cigar bunch.

FRANK R. SCHMITT.